US012621923B2

(12) United States Patent
Gulliford et al.

(10) Patent No.: US 12,621,923 B2
(45) Date of Patent: May 5, 2026

(54) PARTICLE ACCELERATOR SYSTEM AND METHOD OF OPERATION

(71) Applicant: xLight Inc., Palo Alto, CA (US)

(72) Inventors: Colwyn Gulliford, Palo Alto, CA (US); David Douglas, Palo Alto, CA (US)

(73) Assignee: xLight Inc., Palo Alto, CA (US)

( * ) Notice: Subject to any disclaimer, the term of this patent is extended or adjusted under 35 U.S.C. 154(b) by 0 days.

(21) Appl. No.: 19/347,496

(22) Filed: Oct. 1, 2025

(65) Prior Publication Data

US 2026/0096008 A1 Apr. 2, 2026

Related U.S. Application Data

(60) Provisional application No. 63/701,791, filed on Oct. 1, 2024.

(51) Int. Cl.

*H05H 7/08* (2006.01)
*H05H 7/04* (2006.01)
*H05H 7/06* (2006.01)

(52) U.S. Cl.

CPC ................ *H05H 7/08* (2013.01); *H05H 7/04* (2013.01); *H05H 7/06* (2013.01); *H05H 2007/045* (2013.01); *H05H 2007/065* (2013.01); *H05H 2007/084* (2013.01)

(58) Field of Classification Search

CPC .. H05H 7/08; H05H 7/04; H05H 7/06; H05H 2007/045; H05H 2007/065; H05H 2007/084

See application file for complete search history.

(56) References Cited

U.S. PATENT DOCUMENTS

| | | | | |
|---|---|---|---|---|
| 8,093,840 | B1 | 1/2012 | Douglas | |
| 2016/0302295 | A1* | 10/2016 | Umstadter | H05G 2/003 |
| 2020/0170099 | A1* | 5/2020 | Abs | H05H 13/10 |

OTHER PUBLICATIONS

Courantt, et al., "Theory of the Alternating-Gradient Synchrotron", Annals of Physics 281, 360-408 (2000).

Kewisch, et al., "Beam Optics for the RHIC Low Energy Electron Cooler (LERec)", Proceedings of NAPAC2016, Chicago, IL, USA, WEPOB56, ISBN 978-3-5450-180-9, Oct. 9-14, 2016.

Marks, Neil, "Conventional Magnets for Accelerators", The Cockcroft Institute Of accelerator Science and Technology, Conventional Magnets, Spring term 2013.

(Continued)

*Primary Examiner* — Abdullah A Riyami
*Assistant Examiner* — Syed M Kaiser
(74) *Attorney, Agent, or Firm* — Jeffrey Schox; Samuel Rosenthal

(57) ABSTRACT

A particle accelerator system, preferably including an injection beamline, a return beamline, and a merged beamline, and optionally including a beam separator. The particle accelerator system preferably includes a plurality of electron optics elements, such as dipole magnets, quadrupole magnets, solenoid elements, and/or higher-order magnetic elements, which can function to direct electrons (and/or other charged particles) along the beamlines. A method of operation, preferably including injecting electrons, merging beamlines, accelerating the injected electrons, and/or using the accelerated electrons, and optionally including receiving return electrons, dumping used electrons, and/or returning the accelerated electrons.

20 Claims, 7 Drawing Sheets

(56) References Cited

OTHER PUBLICATIONS

Reiser, Martin, “Beam Optics and Focusing Systems without Space Charge”, Theory and Design of Charged Particle Beams (2nd edition), by Martin Reiser (Wiley 2008), section 3.4.4 (pp. 88-91), Mar. 2008.
Williams, et al., “Arclike variable bunch compressors”, Physical Review Accelerators and Beams, 23, 100701 (2020).
Zhang, et al., “Suppression of the coherent synchrotron radiation induce emittance growth in a double-bend achromat with bunch compression”, Physical Review Accelerators and Beams, 26, 505701 (2023).

* cited by examiner

PARTICLE ACCELERATOR SYSTEM AND METHOD OF OPERATION

CROSS-REFERENCE TO RELATED APPLICATIONS

This application claims the benefit of U.S. Provisional Application No. 63/701,791, filed Oct. 1 2024, which is incorporated in its entirety by this reference.

TECHNICAL FIELD

This invention relates generally to the particle accelerator field, and more specifically to a new and useful particle accelerator system and method of operation.

DESCRIPTION OF THE PREFERRED EMBODIMENTS

Figure 1A:
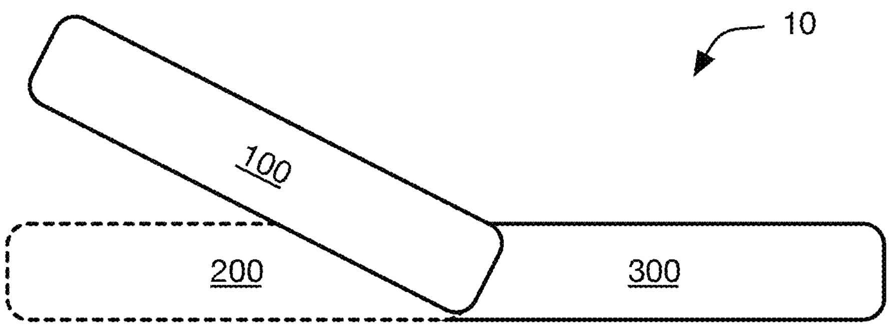
FIG. 1A is a schematic representation of the particle accelerator system.
Figure 1B:
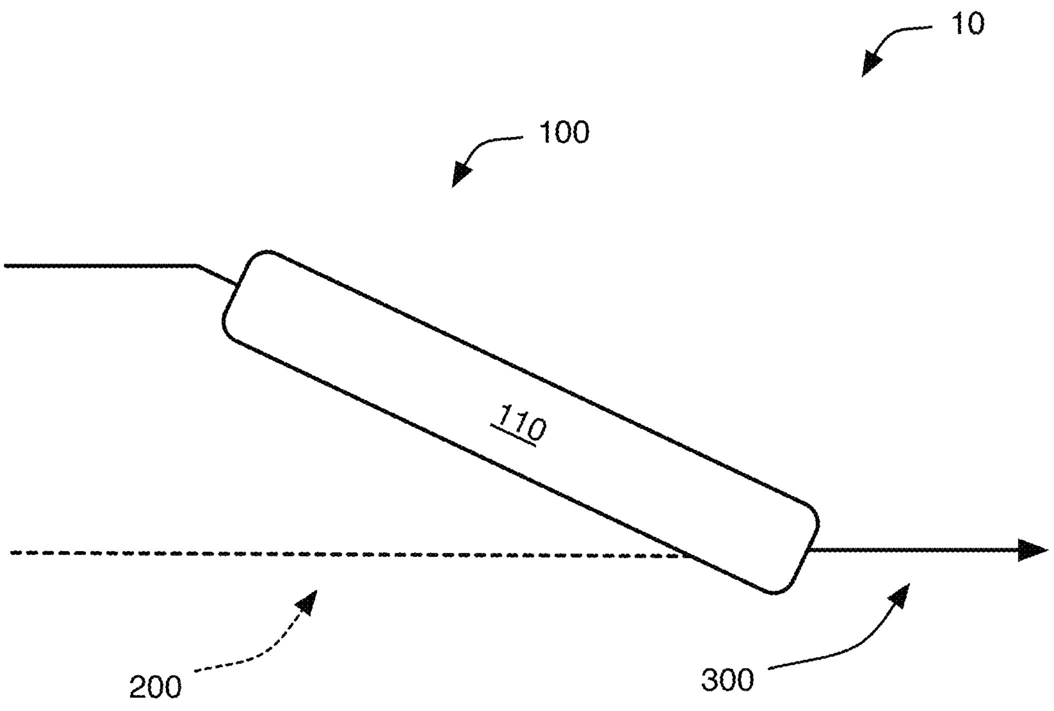
FIGS. 1B-1C are schematic representations of a first and second variant, respectively, of the particle accelerator system.
Figure 1C:
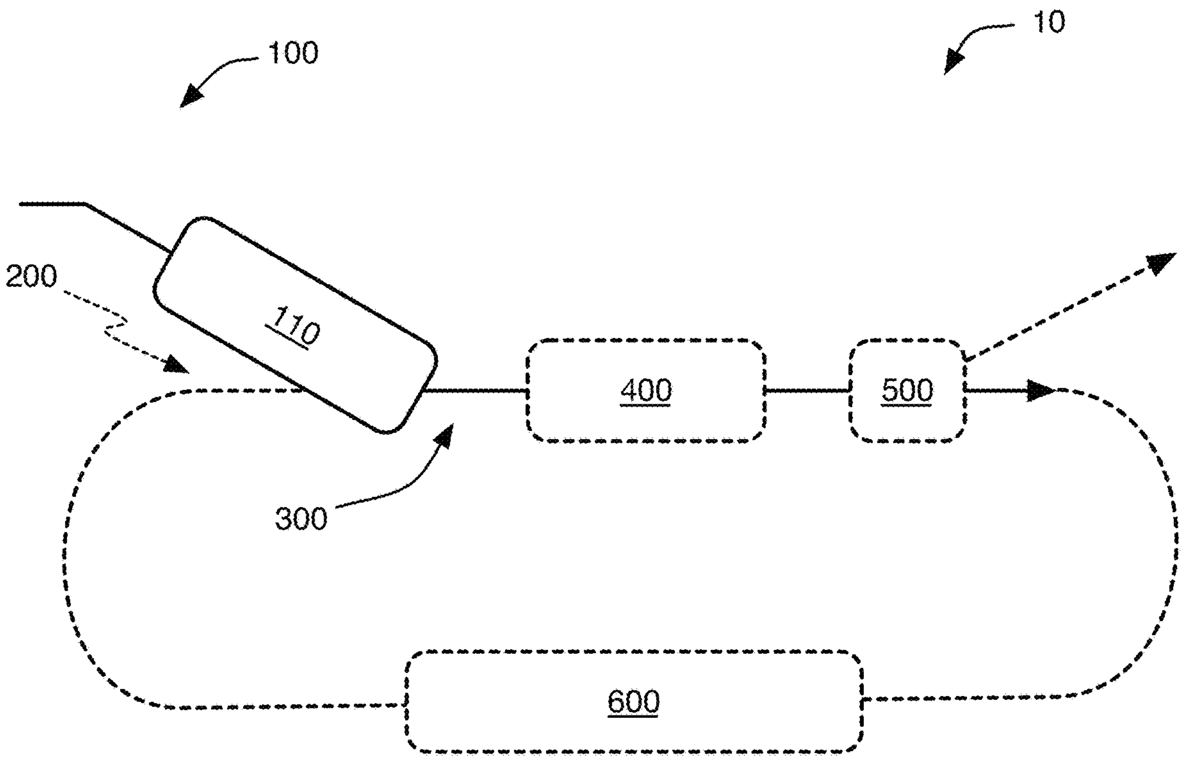
Figure 1D:
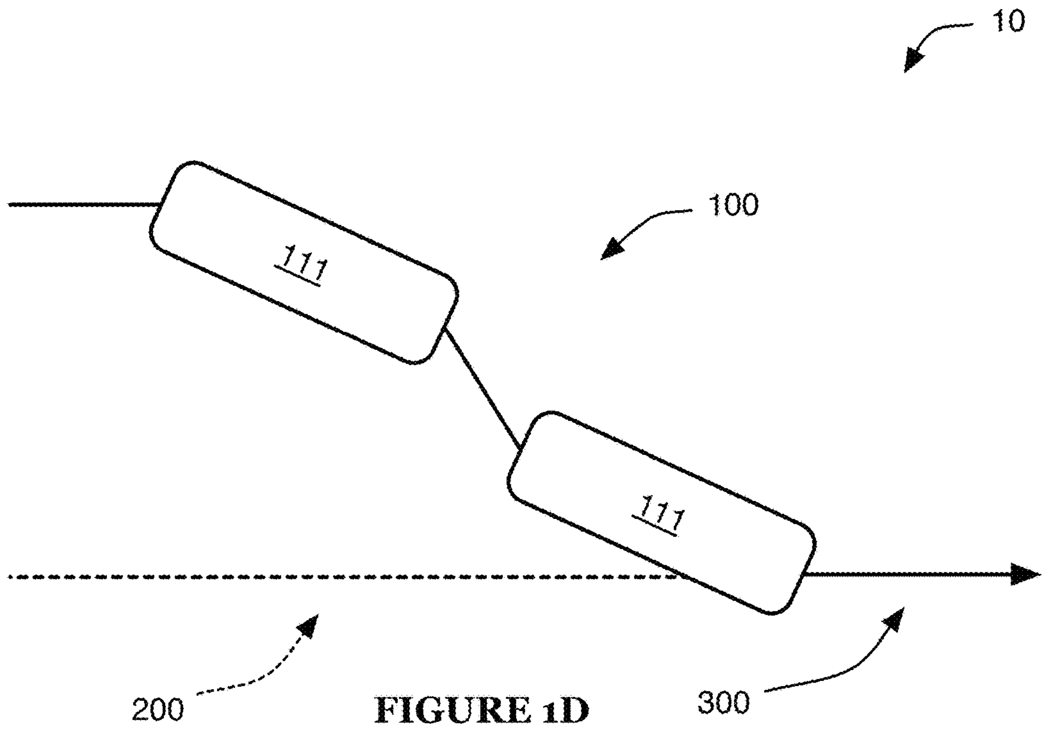
FIG. 1D is a schematic representation of an embodiment of the particle accelerator system.

The following description of the preferred embodiments of the invention is not intended to limit the invention to these preferred embodiments, but rather to enable any person skilled in the art to make and use this invention.

1. Overview

A particle accelerator system 10 preferably includes an injection beamline 100, a return beamline 200, and a merged beamline 300 (e.g., as shown by way of examples in FIGS. 1A, 1B, 1C, 1D, 2A, 2B, 3A, and/or 3B), and can optionally include one or more: energy recovery accelerators 400, beam separators 500, and/or undulators 600. The system preferably includes a plurality of electron optics elements, such as dipole magnets (e.g., chevron dipoles), quadrupole magnets, solenoid elements, and/or higher-order magnetic elements, which can function to direct electrons (and/or other charged particles) along the beamlines.

The particle accelerator system is preferably configured to perform the method of operation described below, but can additionally or alternatively have any other suitable functionality.

Figure 5:
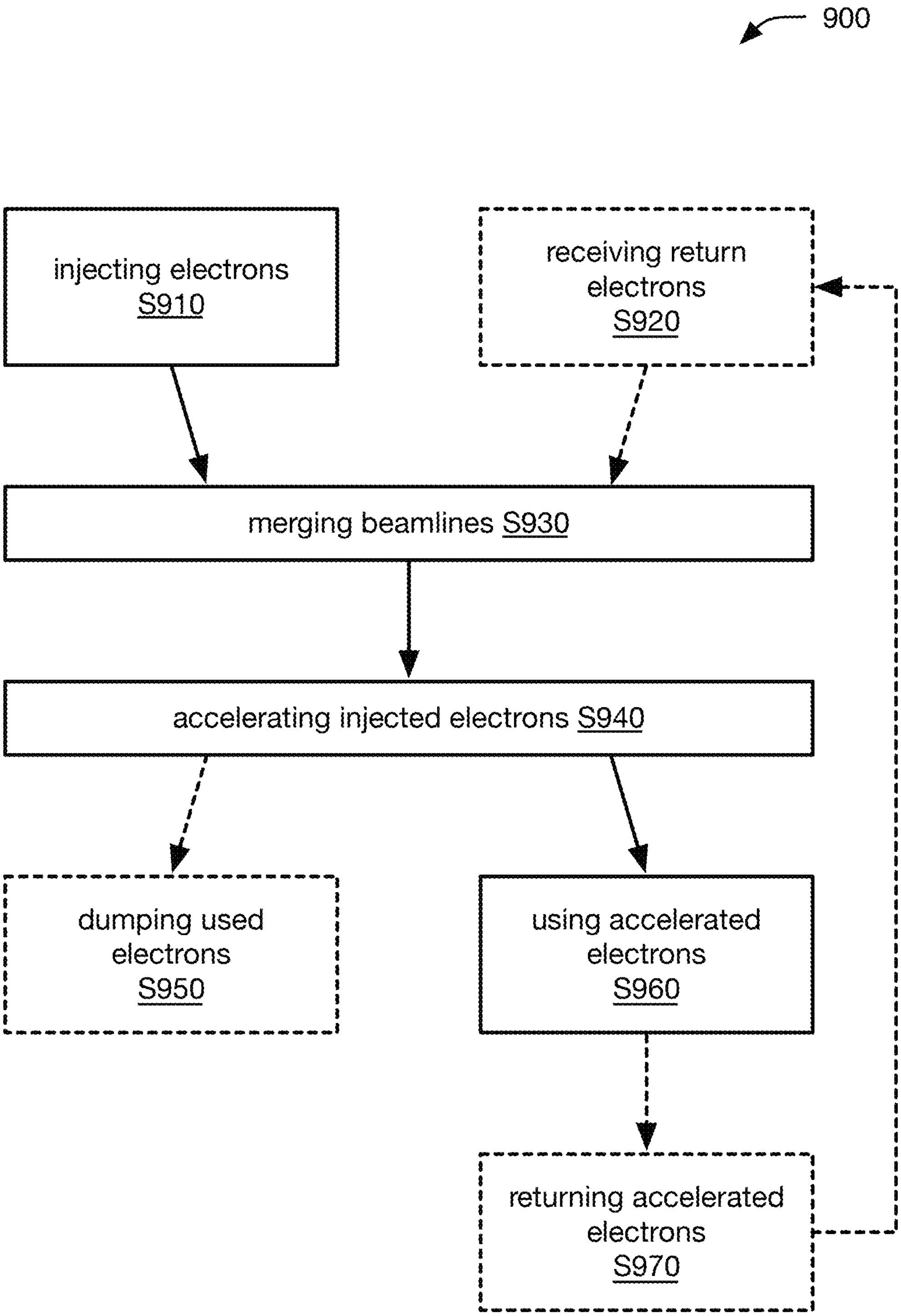
FIG. 5 is a schematic representation of an embodiment of a method of operation for a particle accelerator system.

A method of operation 900 preferably includes: injecting electrons S910, merging beamlines S930, accelerating the injected electrons S940, and/or using the accelerated electrons S960, such as shown by way of example in FIG. 5. The method 900 can optionally include: receiving return electrons S920, dumping used electrons S950, and/or returning the accelerated electrons S970. However, the method can additionally or alternatively include any other suitable elements performed in any suitable manner.

The method is preferably performed using the particle accelerator system described herein, but can additionally or alternatively be performed using any other suitable system (s).

Some embodiments of the particle accelerator system may additionally or alternatively be configured to accelerate and/or control charged particles other than electrons (e.g., positrons, protons, ions, etc.). A person of skill in the art will recognize that, although referred to herein as "electron optics elements", such a system would instead include analogous optics configured to steer, focus, and/or otherwise redirect the relevant charged particles used in the system (e.g., rather than electrons). Further, a person of skill in the art will recognize that, although reference is made herein to electrons, for embodiments in which the system is configured to operate using other charged particles, the term "charged particle" (or, analogously, the relevant charged particle, such as "positron", "proton", "ion", etc.) can be substituted in place of the term "electron". Analogously, some embodiments of the method may additionally or alternatively include accelerating and/or controlling charged particles other than electrons (e.g., positrons, protons, ions, etc.); accordingly, a person of skill in the art will recognize that the method can include accelerating, steering, focusing, and/or otherwise controlling any suitable charged particles, and that, for such embodiments, the term "charged particle" (or, analogously, the relevant charged particle, such as "positron", "proton", "ion", etc.) can be substituted in place of the term "electron".

2. System

2.1 Injection Beamline

The injection beamline preferably functions to inject electrons (e.g., from one or more cathodes, such as photocathodes), such as injecting the electrons into a particle accelerator loop. The injection beamline preferably includes a plurality of electron optics elements. These elements are preferably axisymmetric (or substantially axisymmetric) and preferably define achromatic (or substantially achromatic) modules (e.g., in order to control space charge effects between the relatively low-energy electrons in the injection beamline; in order to avoid, minimize, and/or otherwise reduce chromatic dispersion within the injection beamline; etc.).

The injection beamline preferably imposes a significant displacement (e.g., vertical displacement) between an initial electron trajectory (e.g., at the cathode, at a point at which electrons are received for injection, etc.) and a final electron trajectory (e.g., at an injection point, such as at a merge element configured to merge the electrons of the injection beamline with other electrons within the particle accelerator system). For example, the injection beamline can achieve a vertical displacement between the initial and final trajectories of more than one meter (e.g., 1.5, 2, 3, 5, 1-2, 2-3, 3-5, 5-10, and/or more than 10 m, etc.), but can alternatively achieve a vertical displacement of less than one meter and/or achieve any other suitable displacement(s). Such a significant displacement (e.g., vertical displacement) can enable construction of radiation shielding (e.g., a concrete floor) between the initial electron trajectory and the final electron trajectory, such as between the one or more cathodes and the high-energy beamline (or beamlines), thereby allowing safe access to the one or more cathodes by personnel (e.g., for maintenance purposes) while accelerator operation continues (e.g., providing shielding to such personnel from the radiation generated by the high-energy electrons within the accelerator). In some examples, the final electron trajectory is parallel (or substantially parallel) to the initial electron trajectory. However, the trajectories can alternatively be non-parallel, such as being arranged along parallel planes (e.g., horizontal, or substantially horizontal, planes), or arranged along intersecting lines. However, the injection beamline can additionally or alternatively achieve any other suitable displacements in any suitable directions.

Accordingly, the injection beamline preferably includes one or more transverse translators 110. The transverse translator preferably functions to achieve the significant displacement described above (and/or to achieve any other suitable displacement within the injection beamline). The transverse translator preferably achieves an achromatic (or substantially achromatic) translation of the injection beamline (e.g., wherein the effect of the transverse translator on the injected electrons is axially symmetrical or substantially axially symmetrical); however, the transverse translator can additionally or alternatively have any suitable effect on the injected electrons.

The transverse translator preferably includes a plurality of multi-bend achromats 111, but can additionally or alternatively include any other suitable elements in any suitable arrangement. Each such multi-bend achromat is preferably axisymmetric, but can alternatively have effects on the injected electrons that are not axially symmetrical. Each dipole magnet of the multi-bend achromat (e.g., wherein the multi-bend achromat includes one dipole magnet for each bend) is preferably axisymmetric (or substantially axisymmetric). For example, each dipole (or any suitable subset of the dipoles of the system) can be a chevron dipole, such as a dipole having an entry face configured to accept the entering electron beam and an exit face configured to output the exiting electron beam, the dipole defining an entry face angle (e.g., measured between the beam trajectory at the entry face and a vector normal to the entry face) and exit face angle (e.g., measured between the beam trajectory at the exit face and a vector normal to the exit face) each equal to (or approximately equal to) one quarter of the bend angle imposed on the electrons traversing the dipole (and/or otherwise configured to exhibit axisymmetric or substantially axisymmetric edge focusing). Additionally or alternatively, one or more of the dipoles could be (or include) a combined function magnet (e.g., such as described in Courant, E. D., & Snyder, H. S. (2000). Theory of the alternating-gradient synchrotron. *Annals of physics,* 281(1-2), 360-408., and/or in Marks, N. (2013). Conventional magnets for accelerators. https://www.cockcroft.ac.uk/wp-content/uploads/2014/12/N_MArks_Basic-course_13_part1-2.pdf, each of which is herein incorporated in its entirety by this reference), such as a dipole-quadrupole magnet (but additionally or alternatively a dipole-sextupole magnet, dipole-quadrupole-sextupole magnet, and/or any other suitable combined function magnet).

Figure 2A:
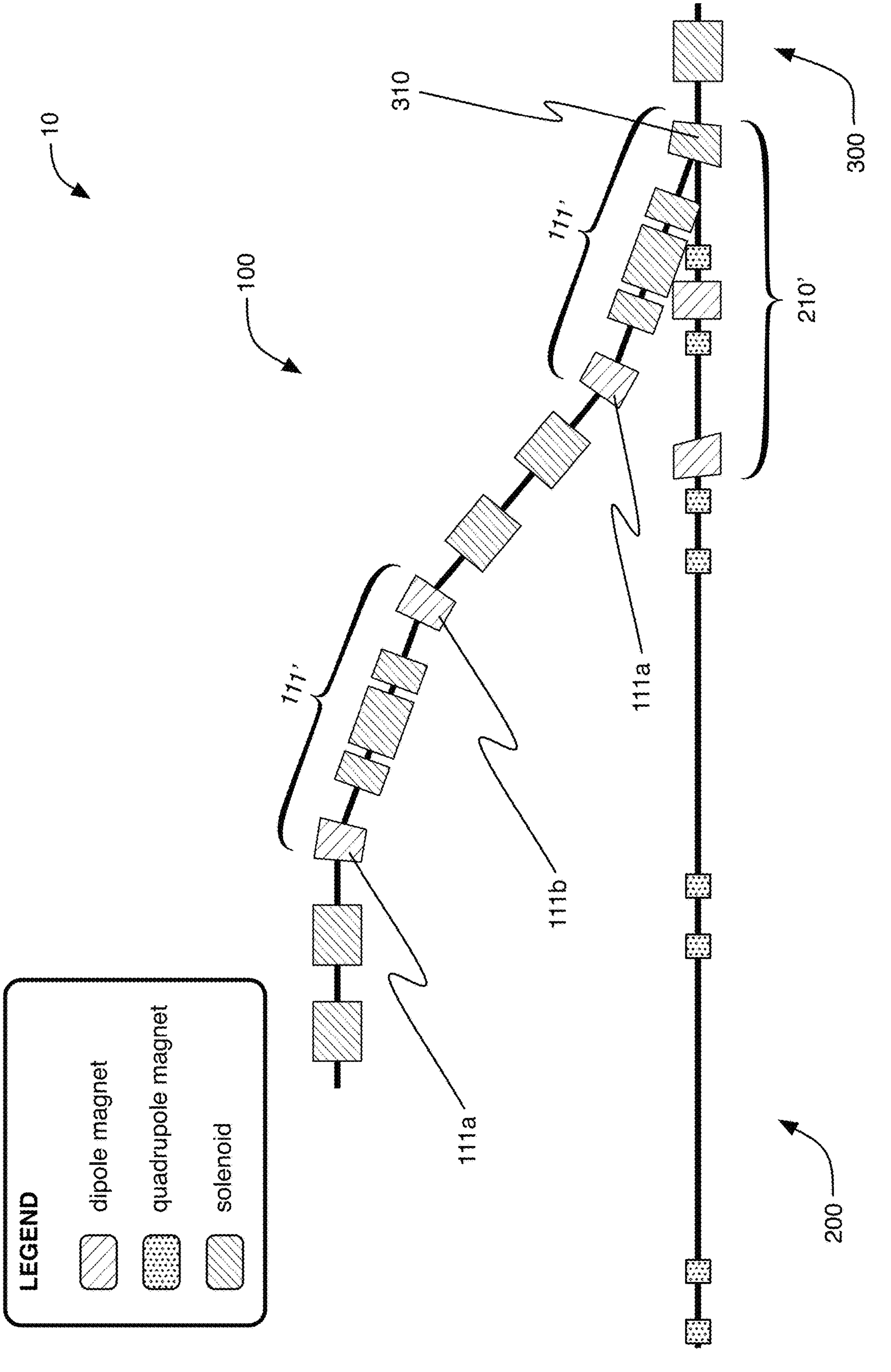
FIG. 2A is a schematic representation of a first example of the particle accelerator system.

In one embodiment, one or more of the multi-bend achromats 111 is a double-bend achromat 111' (wherein the injection beamline includes one or more double-bend achromats, such as shown by way of examples in FIGS. 2A and/or 2B). Each double-bend achromat preferably includes two dipole magnets (each defining one of the two bends in the achromat): an entry dipole nia and an exit dipole nib. The entry dipole and exit dipole are preferably identical (or substantially identical) to each other, and preferably are both axisymmetric (e.g., each being a chevron dipole, each being a combined function dipole, etc.). The double-bend achromat preferably achieves 180° of betatron advance between the two dipoles, such as by including one or more focusing elements configured to achieve the appropriate amount of betatron advance. Each focusing element is preferably an axisymmetric element, such as a solenoid lens (e.g., as described in Reiser, M. (2008). *Theory and design of charged particle beams*. Wiley-VCH., which is herein incorporated in its entirety by this reference, such as described in section 3.4.4 thereof entitled “Solenoidal Magnetic Lenses”); however, the focusing elements can additionally or alternatively include quadrupole magnets and/or any other suitable elements. Each double-bend achromat can include one, two, three, four, five, or more than five such focusing elements. The elements of the achromat preferably define a symmetrical (or a substantially symmetrical) arrangement, but can alternatively define any other suitable arrangement. In one example, the double-bend achromat includes three solenoids in a symmetrical arrangement between the two dipoles (e.g., as shown in FIGS. 2A and/or 2B), wherein the two double-bend achromats (and intervening elements) preferably define an anti-symmetric configuration (e.g., with respect to element arrangement and polarity), possibly with the exception of the solenoid polarities within the double-bend achromats (e.g., wherein the solenoid polarities are identical between the two double-bend achromats).

Figure 2B:
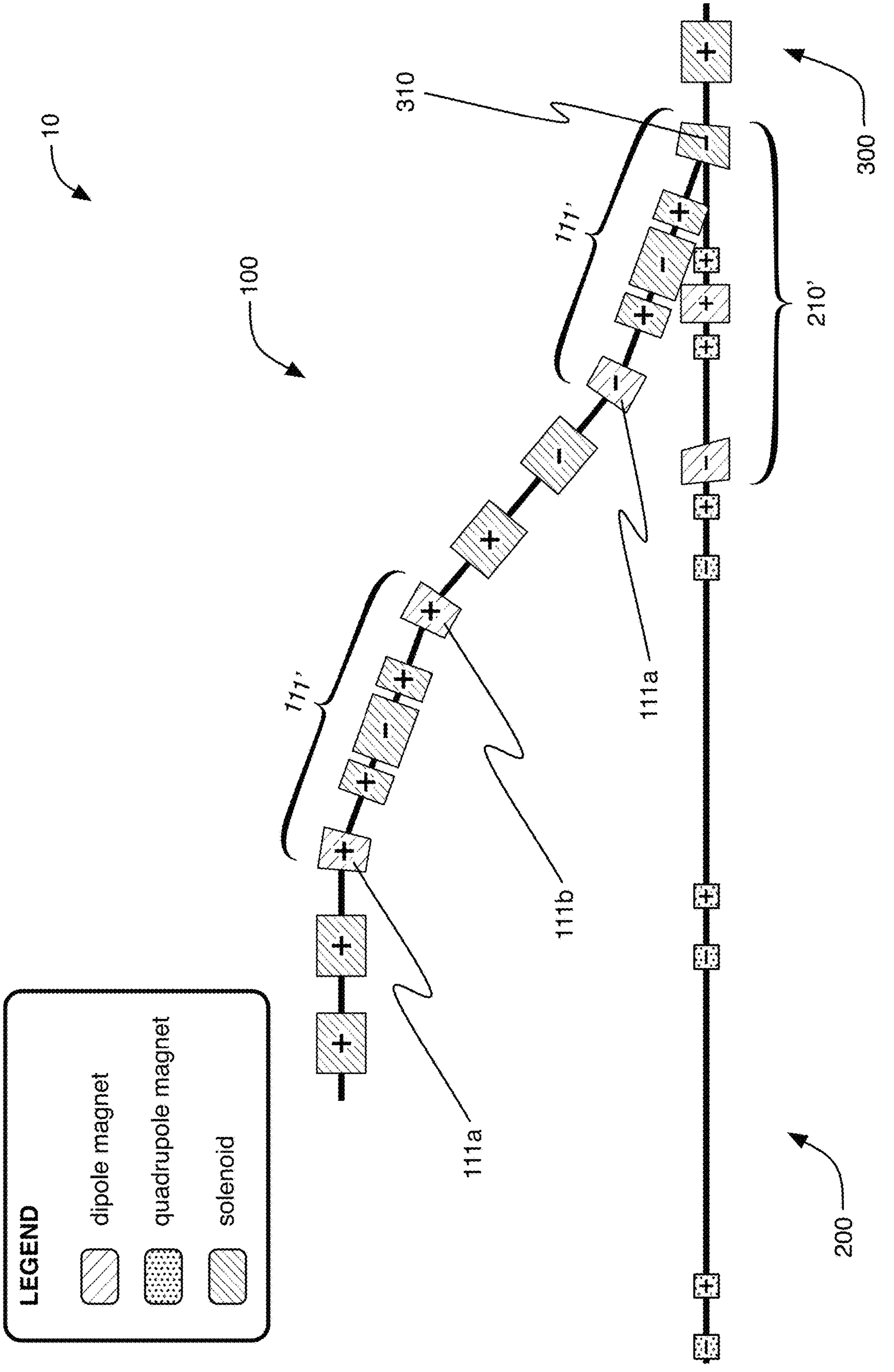
FIG. 2B is a schematic representation of a specific example of the particle accelerator system.

In a specific example (e.g., as shown in FIG. 2B, in which the magnetic element polarities are depicted by a ‘+’ or ‘−’ sign, representing a positive or negative polarity, respectively, superimposed on the depiction of the magnetic element), in which the injection beamline imposes a significant translation on a transverse y plane in the negative y direction (wherein the transverse directions are defined on a transverse x plane and a transverse y plane orthogonal to the transverse x plane), the magnetic elements are arranged as specified below, wherein a positive-polarity solenoid (“positive solenoid”) has an axial magnetic field oriented substantially in the beam direction, a negative-polarity solenoid (“negative solenoid”) has an axial magnetic field oriented substantially opposite the beam direction, a positive-polarity quadrupole magnet (“positive quad”) focuses in the transverse x plane and defocuses in the transverse y plane, a negative-polarity quadrupole magnet (“negative quad”) focuses in the transverse y plane and defocuses in the transverse x plane, a positive-polarity dipole magnet (“positive dipole”) bends the electron beam in the negative y direction, and a negative-polarity dipole magnet (“negative dipole”) bends the electron beam in the positive y direction. In this specific example, the injection beamline includes, in order from upstream to a downstream end that terminates at the merge element: two positive solenoids; a first double-bend achromat including a positive dipole, a positive solenoid, a negative solenoid, a positive solenoid, and a positive dipole (e.g., wherein the positive solenoids of the double-bend achromat have half the length of the negative solenoid of the double-bend achromat); a positive solenoid; a negative solenoid; and a second double-bend achromat including a negative dipole, a positive solenoid, a negative solenoid, a positive solenoid, and the merge element, wherein the merge element is a negative dipole (e.g., wherein the positive solenoids of the double-bend achromat have half the length of the negative solenoid of the double-bend achromat). In this specific example, the return beamline includes, in order from upstream to a downstream end that terminates at the merge element: a first quadrupole doublet including a negative quad and a positive quad; a second quadrupole doublet including a negative quad and a positive quad; a third quadrupole doublet including a negative quad and a positive quad; and a dispersion suppressor that terminates at the merge element (e.g., a chicane including a negative dipole, a positive quad, a positive dipole, a positive quad, and the merge element). In this specific example, the merged beamline preferably includes a positive solenoid arranged downstream of the merge element. However, a person of skill in the art will recognize that the polarity of some or all of the solenoids of this specific example could be inverted without negatively impacting the performance of the system; for example, one (or both) of the double-bend achromats could include a negative solenoid, a positive solenoid (e.g., of twice the length and/or intensity of the negative solenoids of the double-bend achromat), and another negative solenoid, or the polarities of all solenoids of the system (or all except those of one or both double-bend achromats) could be inverted.

The multi-bend achromats of the injection beamline are preferably separated by one or more additional beamline segments (e.g., straight, or substantially straight, beamline segments). For example, the injection beamline can include a straight (or substantially straight) beamline segment between two multi-bend achromats. In some examples, the desired displacement between initial and final electron trajectories (e.g., vertical displacement) can be increased by the inclusion of this segment, wherein the beam path increases this displacement along the length of the segment (e.g., as shown by way of examples in FIGS. 1D, 2A, and/or 2B).

The elements of the injection beamline preferably define an anti-symmetric (or substantially anti-symmetric) arrangement (e.g., as shown by way of examples in FIGS. 1B, 1C, 1D, 2A, and/or 2B). In a first example, the injection beamline can include two multi-bend (e.g., double-bend) achromats identical to each other, but arranged with opposing orientations to each other (e.g., wherein one imposes a downward bend on a horizontal beam, and the other bends the beam upward from the resulting trajectory back onto a horizontal trajectory), and optionally including one or more additional elements (e.g., additional solenoids) between the two (e.g., as shown by way of examples in FIGS. 1D, 2A, and/or 2B). In a second example, the injection beamline can include a single dogleg (e.g., solenoid-focused dogleg, such as shown by way of examples in FIGS. 3A and/or 3B; quadrupole-focused dogleg; etc.). However, the injection beamline can additionally or alternatively include any other suitable elements in any suitable arrangement.

The final dipole of the injection beamline (e.g., the exit dipole of the final multi-bend achromat of the injection beamline) preferably functions as a merge element 310 for the system. This merge element preferably functions to receive both the electrons traversing the injection beamline and the electrons traversing the return beamline, and merge these two sets of electrons onto the merged beamline, such as described below in more detail.

In one example (e.g., as shown in FIG. 2A), the injection beamline includes two double-bend achromats, separated by a straight segment. The elements of the injection beamline preferably define a substantially anti-symmetric arrangement along the beam path. In this example, each double-bend achromat includes an entry chevron dipole, an exit chevron dipole (substantially identical to the entry dipole), and a plurality of solenoids. The solenoids are preferably arranged between the entry and exit dipoles, and are preferably configured to achieve a 180° degree betatron advance between the dipoles. For example, the achromat can include two solenoids of equal length and the same polarity, and a third solenoid double the length of each of the first two solenoids and having the opposite polarity of the first two solenoids, wherein the third solenoid is arranged between the first two solenoids, and wherein all the solenoids define a symmetrical arrangement between the entry and exit dipoles (e.g., as shown in FIG. 2A). As described above, the elements of the double-bend achromat preferably define a substantially symmetric arrangement along the beam path. Further, in this example, the straight segment can optionally include one or more solenoids (e.g., including two solenoids of equal length and opposite polarities, arranged anti-symmetrically along the beam path).

However, the injection beamline can additionally or alternatively include any other suitable elements in any suitable arrangement.

2.2 Return Beamline

The return beamline preferably functions to transport returning electrons (e.g., high-energy electrons for use in energy recovery, such as wherein the system includes an energy recovery loop that includes the return beamline and merged beamline) to the merged beamline.

Figure 3A:
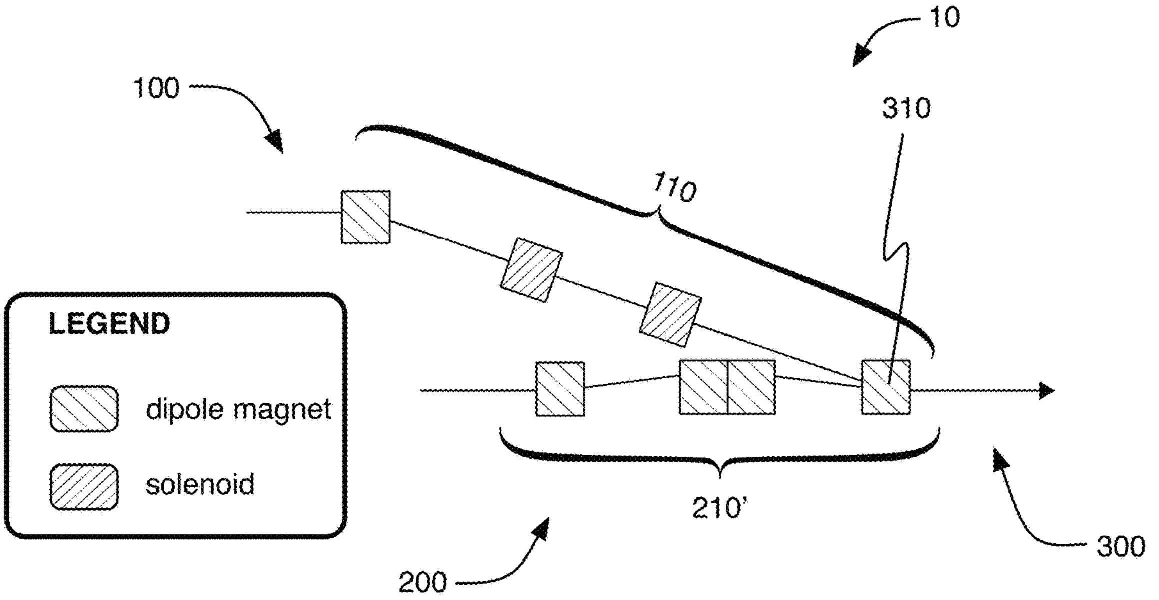
FIGS. 3A-3B are schematic representations of a second and third example, respectively, of the particle accelerator system.

The return beamline preferably includes a dispersion suppressor 210 (e.g., as shown by way of examples in FIGS. 2A, 2B, 3A, and/or 3B). The dispersion suppressor preferably functions to achieve a zero (or substantially zero) dispersion condition for the return beam after passing through the merge element. In variations, the dispersion suppressor can include one or more chicanes 210', doglegs 210", and/or any other suitable structures.

In a first variation, the dispersion suppressor 210 can include (e.g., be) a chicane 210' (e.g., as shown by way of examples in FIGS. 2A, 2B, and/or 3A). The elements of the chicane preferably define a symmetric (or substantially symmetric) arrangement. The chicane preferably ends at the merge element, more preferably beginning at a second element matching the merge element in design. For example, the chicane can include two dipoles of matching design, one each at the beginning and end of the chicane. A person of skill in the art will recognize that although these dipoles preferably have slanted faces as described above regarding the injection beamline (e.g., such that the merge element imposes axisymmetric effects on the electrons of the injection beamline), the effects of these dipoles will not typically be axisymmetric on the electrons of the return beamline (e.g., as the bend angle imposed on the electrons of the return beamline by this merge element will be significantly smaller than the bend angle imposed on the electrons of the injection beamline by this merge element). Note that, as the electrons of the return beam typically have much higher energies than those of the injection beam, the effects of axial asymmetries on the electrons of the return beam may be tolerable (e.g., may not cause significant deleterious effects for operation of the system).

The chicane preferably includes one or more additional dipoles, which can function to redirect the electrons back toward the merge element. In a first example, the chicane includes one additional dipole at its midpoint. In another example, the chicane includes a plurality of dipoles arranged symmetrically about its midpoint. However, the chicane can additionally or alternatively include any other suitable dipoles in any suitable arrangement.

Figure 3B:
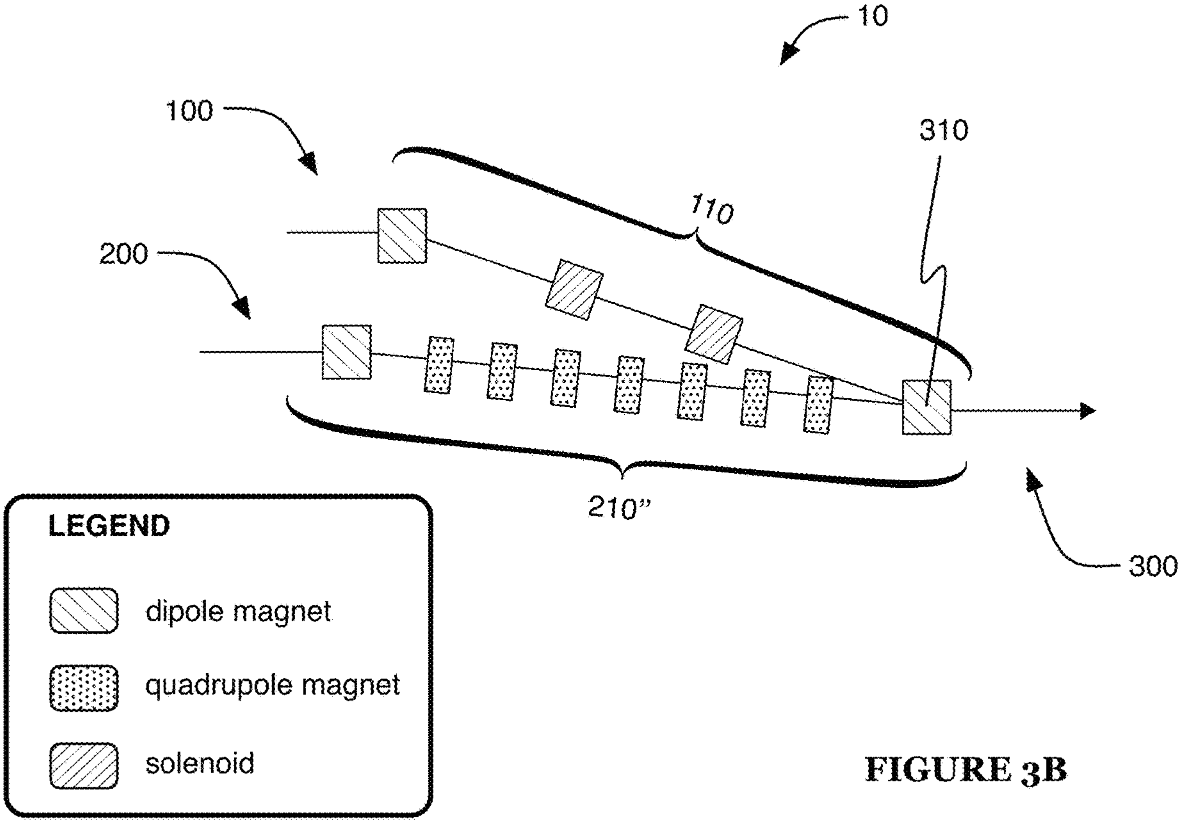

In a second variation, the dispersion suppressor 210 can include (e.g., be) a dogleg 210" (e.g., as shown by way of example in FIG. 3B). The elements of the dogleg preferably define an anti-symmetric (or substantially anti-symmetric) arrangement. The dogleg preferably ends at the merge element, more preferably beginning at a second element matching the merge element in design (e.g., but with opposite polarity and/or arrangement). For example, the dogleg can include two dipoles of matching design, one each at the beginning and end of the chicane. A person of skill in the art will recognize that although these dipoles preferably have slanted faces as described above regarding the injection beamline (e.g., such that the merge element imposes axisymmetric effects on the electrons of the injection beamline), the effects of these dipoles will not typically be axisymmetric on the electrons of the return beamline (e.g., as the bend angle imposed on the electrons of the return beamline by this merge element will be significantly smaller than the bend angle imposed on the electrons of the injection beamline by this merge element). Note that, as the electrons of the return beam typically have much higher energies than those of the injection beam, the effects of axial asymmetries on the electrons of the return beam may be tolerable (e.g., may not cause significant deleterious effects for operation of the system).

The dogleg preferably includes one or more additional magnetic elements (e.g., configured to provide dispersion suppression), such as focusing elements. In a first example (e.g., as shown in FIG. 3B), the dogleg 210" includes one or more quadrupole magnets (e.g., an odd number of quadrupole magnets with alternating polarities) arranged between the entry and exit dipoles. In a second example, the dogleg 210" includes one or more solenoids (e.g., an even number of solenoids, such as two solenoids) arranged between the entry and exit dipoles. In a third example, the dogleg 210" includes one or more quadrupole magnets and one or more solenoids arranged between the entry and exit dipoles. However, the dogleg can additionally or alternatively include any other suitable elements in any suitable arrangement and/or having any suitable functionality.

The dispersion suppressor can optionally include one or more additional elements (e.g., additional dipole magnets, quadrupole magnets, solenoids, higher-order magnetic elements, such as sextupoles, octupoles, etc.). For example, the dispersion suppressor (e.g., the chicane or dogleg thereof) is preferably configured to provide dispersion suppression (e.g., through an appropriate arrangement of magnetic elements, such as the additional elements described above). Further, the return beamline can additionally or alternatively include any other suitable elements in any suitable arrangement.

In an alternate embodiment, the system does not include a return beamline (or the system includes a return beamline, but the return beamline does not merge with the injection beamline). For example, the injection beamline and merged beamline (as described herein) can define a path for the injected electrons, such as wherein the injection beamline imposes a significant displacement (e.g., vertical displacement) between the initial and final electron trajectories, but without merging the injected electron beam with return electrons. In such an embodiment, the elements of the injection beamline and merged beamline are preferably the same (or substantially the same) as the other embodiments described herein, such as wherein the system merely omits the elements of the return beamline (e.g., wherein the system still includes a merge element, such as the final dipole magnet of the injection beamline, but wherein this merge element receives only the injected electrons, rather than also receiving return electrons and merging the two beampaths; wherein the system still includes a merge element, such as the final dipole magnet of the injection beamline, but wherein this merge element receives the injected electrons and a second electron beam other than return electrons, and merges these two beampaths, such as in a manner analogous to merging the injected electrons with the return electrons; etc.).

2.3 Merged Beamline

The merged beamline preferably functions to carry both the injected electrons received from the injection beamline and the (higher energy) electrons received from the return beamline.

The injection beamline and return beamline preferably meet at a merge element 310 (e.g., as describe above). The merge element is preferably a dipole magnet, more preferably a chevron dipole (imposing axisymmetric, or substantially axisymmetric, fields on the injection beamline, but not necessarily on the return beamline), such as shown by way of example in FIG. 4. The merge element is preferably configured to direct electrons from both the injection beamline and the return beamline onto the merged beamline (e.g., wherein the trajectories of all such electrons are preferably substantially collinear after merging). For example, the merge element can be the final dipole element of both the injection beamline and the return beamline (e.g., the exit dipole of the final multi-bend achromat of the injection beamline).

Figure 4:
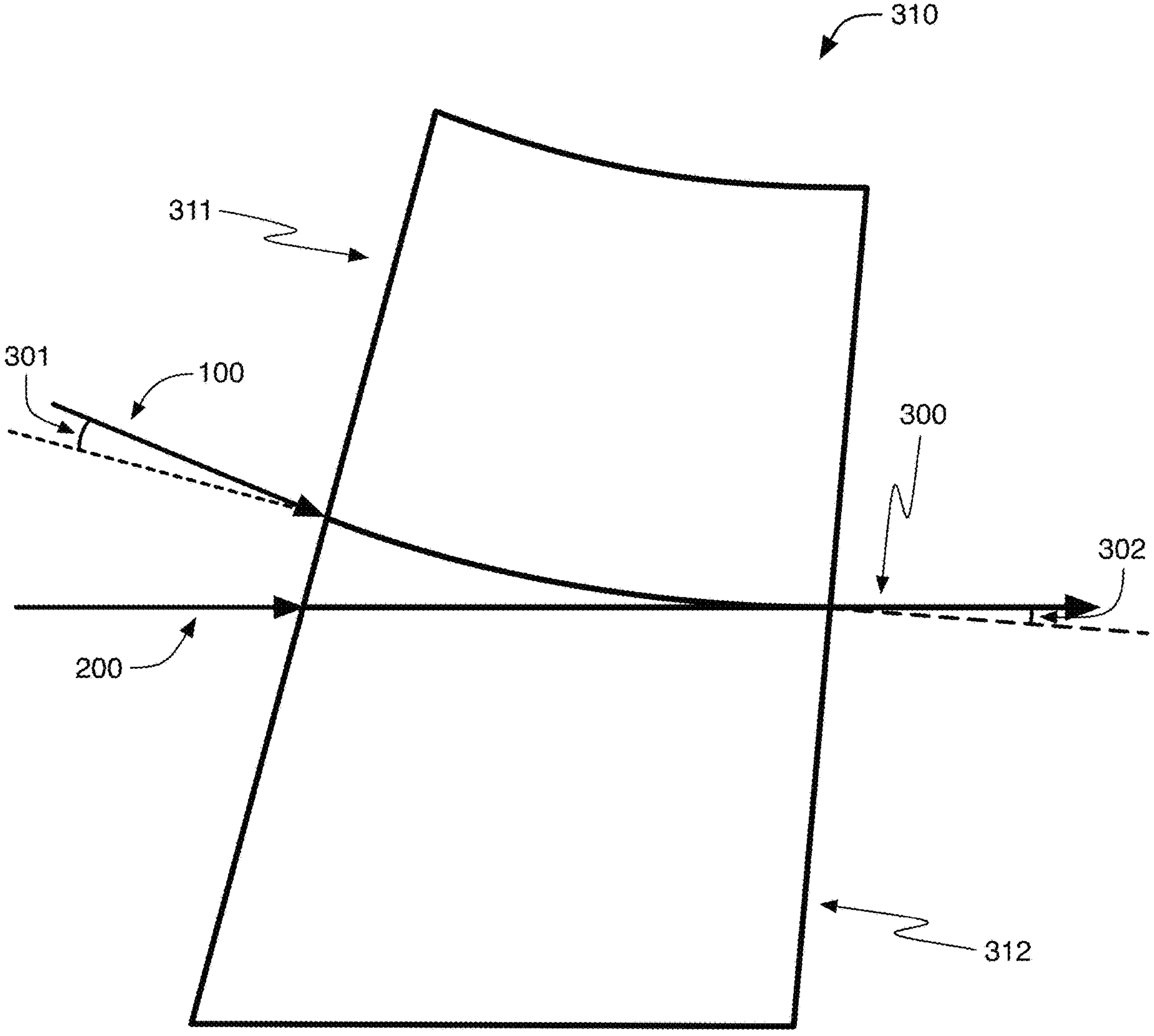
FIG. 4 is a schematic representation of an example of a merge element of the particle accelerator system.

The merge element is preferably axisymmetric (or substantially axisymmetric) with respect to the injection beamline (but not necessarily with respect to the return beamline). For example, the merge element can be a chevron dipole (e.g., as shown in FIG. 4), such as a dipole having an entry face 311 configured to accept the entering electron beam (e.g., of the injection beamline) and an exit face 312 configured to output the exiting electron beam (e.g., merged electron beam exiting along the merged beamline), the dipole defining an entry face angle 301 (e.g., measured between the injection beamline trajectory at the entry face and a vector normal to the entry face) and exit face angle 302 (e.g., measured between the merged beamline trajectory at the exit face and a vector normal to the exit face) each equal to (or approximately equal to) one quarter of the bend angle imposed on the electrons traversing the dipole (and/or otherwise configured to exhibit axisymmetric or substantially axisymmetric edge focusing). Additionally or alternatively, one or more of the dipoles could be (or include) a combined function magnet (e.g., such as described in Courant, E. D., & Snyder, H. S. (2000). Theory of the alternating-gradient synchrotron. *Annals of physics,* 281(1-2), 360-408., and/or in Marks, N. (2013). Conventional magnets for accelerators. https://www.cockcroft.ac.uk/wp-content/uploads/2014/12/N_MArks_Basic-course_13_part1-2.pdf, each of which is herein incorporated in its entirety by this reference), such as a dipole-quadrupole magnet (but additionally or alternatively a dipole-sextupole magnet, dipole-quadrupole-sextupole magnet, and/or any other suitable combined function magnet).

The merged beamline can optionally include one or more additional elements, such as additional dipole magnets, quadrupole magnets, solenoids, higher-order elements (e.g., sextupoles, octupoles, etc.), other electron optics elements, and/or any other suitable elements.

In one example, the merged beamline can deliver electrons to elements configured to accelerate the electrons received from the injection beamline (e.g., using energy from the electrons received from the return beamline), direct the accelerated electrons through one or more undulators, thereby generating one or more light outputs via free-electron lasing, and/or (e.g., after lasing) direct the electrons to the return beamline (e.g., for use in another iteration wherein these electrons are now used for energy recovery purposes to accelerate newly injected electrons).

However, the merged beamline can additionally or alternatively include any other suitable elements in any suitable arrangement.

2.4 Energy Recovery Accelerator

The system can optionally include one or more energy recovery accelerators (e.g., energy recovery linear accelerator). The energy recovery accelerator can function to transfer energy from high-energy electrons (e.g., used electrons, such as electrons of a high-emittance electron beam), such as return electrons received from the return beamline, to lower-energy electrons, such as injected electrons received from the injection beamline.

The energy recovery accelerator is preferably arranged along the merged beamline, more preferably such that both the return electrons and injected electrons are concurrently present within the energy recovery accelerator, thereby enabling energy transfer from the return electrons to the injected electrons (e.g., via RF cavities of the energy recovery accelerator).

In some embodiments, the energy recovery accelerator can include one or more elements such as described in S. Gruner et al. (2002). Energy recovery linacs as synchrotron radiation sources. *Review of Scientific Instruments,* 73(3), 1402-1406, which is herein incorporated in its entirety by this reference.

However, the energy recovery accelerator can additionally or alternatively include any other suitable elements in any suitable arrangement.

2.5 Beam Separator

The system can optionally include one or more beam separators. The beam separator can function to separate lower-energy electrons from the merged beamline. For example, after energy from the return electrons received from the return beamline is used to accelerate the injected electrons received from the injection beamline, the beam separator can function to separate the return electrons (now lower-energy electrons due to the use of their energy to accelerate the injected electrons) from the merged beamline (e.g., directing the separated return electrons to an electron dump; directing the injected electrons along a primary beamline to the return beamline, such as via one or more undulators and/or any other suitable elements; etc.).

The beam separator preferably includes a separator element (e.g., dipole magnet). The separator element preferably functions to redirect electrons based on their electron energy. For example, the separator element can include a dipole magnet (e.g., wherein lower-energy electrons traversing the dipole field will be redirected by a greater amount than higher-energy electrons) that turns the high-energy injected electrons by a first angle, and turns the low-energy return electrons by a second angle substantially greater than the first angle. In a first example, the separator element can be analogous to the merge element 310 (e.g., a mirror image of the merge element), wherein the separator element is configured as a chevron dipole with respect to the low-energy return electrons (e.g., entry and exit angles for the low-energy return electrons are each one quarter of the redirection angle for the low-energy return electrons). In a second example, the separator element can be a configured as a chevron dipole with respect to the high-energy injected electrons (e.g., entry and exit angles for the high-energy injected electrons are each one quarter of the redirection angle for the high-energy injected electrons). However, the separator element can additionally or alternatively include any other suitable elements having any suitable configuration and/or arrangement.

In some variant, the beam separator can have a configuration analogous to that of the injection beamline, return beamline, and/or merge element (e.g., wherein the beam separator is a mirror image of some or all of these elements). In some embodiments, the beam separator can include a separator element that redirects the low-energy return electrons onto a dump path and directs the high-energy injected electrons to remain on the merged beamline. In some such embodiments, the merged beamline (downstream of the separator element) can include a dispersion suppressor analogous to that described above regarding the return beamline (e.g., can include a chicane or dogleg that originates at the separator element and terminates at a matching dipole). Additionally or alternatively, in some such embodiments, the dump path can include a transverse translator analogous to that described above regarding the injection beamline (e.g., can include a multi-bend achromat that originates at the separator element and terminates at a matching dipole).

The beam separator is preferably arranged downstream of the energy recovery accelerator. However, the beam separator can additionally or alternatively have any other suitable arrangement within the accelerator system.

Further, the beam separator can additionally or alternatively include any other suitable elements in any suitable arrangement.

2.7 Undulators

The system can optionally include one or more undulators. The undulator can function to cause high-energy electrons to emit light via free-electron lasing (e.g., as they traverse the undulator). In some embodiments, the system can include one or more elements (e.g, undulators and/or any other suitable elements) such as described in U.S. Pat. No. 12,022,599, issued 25 Jun. 2024 and titled "POLARIZATION-MULTIPLEXED RADIATOR SYSTEM, LIGHT SOURCE SYSTEM, AND METHOD OF OPERATION", which is herein incorporated in its entirety by this reference.

The undulator is preferably arranged downstream of the beam separator (e.g., along the primary beamline), more preferably between the beam separator and the return beamline, but can additionally or alternatively have any other suitable arrangement. The primary beamline preferably traverses the undulator(s) before terminating at the return beamline.

However, the system can additionally or alternatively include any suitable undulators in any suitable arrangement, and/or the primary beamline can additionally or alternatively include any other suitable elements (e.g., configured to use the high-energy electrons in any other suitable manner).

Further, the particle accelerator system can additionally or alternatively be configured in any other suitable manner.

3. Method of Operation

The method preferably includes injecting electrons S910. Injecting electrons is preferably performed at the injection beamline. Injecting electrons preferably functions to provide electrons (e.g., low-energy electrons) for use in the particle accelerator system. However, S91*o* can additionally or alternatively include injecting electrons in any other suitable manner.

The method can optionally include receiving return electrons S920. Receiving return electrons is preferably performed at the return beam line. Receiving return electrons can function to provide used electrons (e.g., high-energy electrons) for energy recovery (e.g., transferring some energy from the used electrons to the low-energy electrons injected in S910). However, S920 can additionally or alternatively include receiving return electrons in any other suitable manner.

The method preferably includes merging beamlines S930. Merging beamlines can function to merge the injected electrons (e.g., from the injection beamline) and the return electrons (e.g., from the return beamline) onto a single beamline (e.g., the merged beamline). Merging beamlines is preferably performed at the merge element. For example, the merge element can configured such that high-energy electrons entering from the return beamline are deflected by a first amount onto the merged beamline, and low-energy electrons entering from the injection beamline are deflected by a second amount (e.g., much larger than the first amount) onto the merged beamline. S930 can additionally or alternatively (e.g., in examples in which the method does not include receiving return electrons) include merging the injected electrons with any other suitable electron beams. However, S930 can additionally or alternatively include merging beamlines in any other suitable manner.

The method preferably includes accelerating injected electrons S940. Accelerating the injected electrons preferably functions to provide sufficient energy to the injected electrons for use downstream (e.g., as described below in more detail regarding S960). Further, S940 can additionally or alternatively function to recover energy from the high-energy return electrons (e.g., using some or all of this energy to accelerate the injected electrons. S940 is preferably performed on the merged beamline, but can additionally or alternatively be performed at any other suitable location within the particle accelerator system. S940 is preferably performed using the energy recovery accelerator, but can additionally or alternatively be performed by any other suitable elements. Further, S940 can additionally or alternatively include accelerating the injected electrons in any other suitable manner.

The method can optionally include dumping used electrons S950. Dumping the used electrons preferably functions to discard the return electrons after they have been used (e.g., used as described below in more detail regarding S960, used for energy recovery such as described above in more detail regarding S940, etc.). S950 is preferably performed at the beam separator (e.g., at the separator element thereof), but can additionally or alternatively be performed by any other suitable elements. For example, S950 can include (e.g., after accelerating the injected electrons S940): separating the used electrons (e.g., low-energy return electrons decelerated in S940) from the injected electrons (e.g., high-energy electrons accelerated in S940), such as at a dipole magnet (e.g., wherein the low-energy return electrons are deflected by a significantly greater amount than the high-energy electrons, thereby separating these electrons onto two different paths), and dumping the separated used electrons (e.g., directing the used electrons to an electron dump, such as an electron-absorptive material). However, S950 can additionally or alternatively include dumping the used electrons in any other suitable manner.

The method preferably includes using the accelerated electrons S960. Using the accelerated electrons preferably functions to utilize the particle accelerator system (e.g., for the purpose for which it was constructed) and the high-energy electron beam. **S96*o* preferably includes using the accelerated electrons to generate light, such as generating light via free-electron lasing at one or more undulators of the particle accelerator system. For example, S96*o* can include directing the accelerated electrons (or any suitable subset thereof) through one or more undulators, wherein the accelerated electrons generate light via free-electron lasing as they propagate through the undulator(s). However, S96*o*** can additionally or alternatively include using the accelerated electrons in any other suitable manner.

The method can optionally include returning accelerated electrons S970. Returning accelerated electrons can function to provide the electrons for energy recovery (e.g., as described above in more detail regarding S940). S970 preferably includes returning the accelerated electrons at the return beamline (e.g., for subsequent merging with the injected electrons, such as described above in more detail regarding S930; for subsequent energy recovery, such as described above in more detail regarding S940; etc.), more preferably after using the accelerated electrons (e.g., as described above in more detail regarding S960). For example, S970 can include (e.g., after use in S960) directing the accelerated electrons (e.g., using one or more dipole magnets and/or higher-order magnetic elements) onto the return beamline. However, S970 can additionally or alternatively include returning the accelerated electrons in any other suitable manner.

The method can optionally be repeated one or more times (e.g., wherein the method is performed continuously, periodically, and/or sporadically). For example, the method can be performed repeatedly (e.g., continuously or substantially continuously) during operation (e.g., nominal operation) of the particle accelerator system. However, the method (and/or any suitable elements thereof) can additionally or alternatively be performed with any suitable timing and/or repetition.

Further, the method 900 can additionally or alternatively include any other suitable elements performed in any suitable manner.

4. Specific Examples

A numbered list of specific examples of the technology described herein are provided below. A person of skill in the art will recognize that the scope of the technology is not limited to and/or by these specific examples.

1. A particle accelerator system comprising:
   - a merge dipole magnet;
   - an injection beamline defining a first beam path from an injection point to the merge dipole magnet via a transverse translator, wherein the transverse translator:
     - comprises a plurality of magnets;
     - terminates at a first region of the merge dipole; and
     - is configured to direct a first electron beam substantially along the first beam path to first region, the first electron beam defining a first average electron energy;
   - a second beamline defining a second beam path from a second point to the merge dipole magnet, wherein the second beamline:

terminates at a second region of the merge dipole, wherein the second region does not intersect the first region; and is configured to direct a second electron beam substantially along the second beam path to the second region, the second electron beam defining a second average electron energy substantially greater than the first average electron energy;

wherein the merge dipole magnet is configured to:

direct the first electron beam from the first region onto a merged trajectory; and direct the second electron beam from the second region onto the merged trajectory.

2. The system of Specific Example 1, wherein:

the merge dipole magnet comprises an entry face and an exit face, wherein the entry face and the exit face are substantially planar;

the first region is on the entry face, wherein the first beam path defines an entry tangent at the entry face;

the merged trajectory extends outward from the merge dipole magnet at the exit face, wherein the merged trajectory defines an exit tangent at the exit face;

the system defines:

an entry face angle between the entry tangent and an entry face normal vector;

an exit face angle between the exit tangent and an exit face normal vector, wherein the exit face angle is substantially equal to the entry face angle; and a first redirection angle between the entry tangent and the exit tangent, wherein the first redirection angle is substantially four times the entry face angle.

3. The system of Specific Example 2, wherein:

the second region is on the entry face, wherein the second beam path defines a second entry tangent at the entry face; and the system further defines:

a second entry face angle between the second entry tangent and the entry face normal vector, wherein the second entry face angle is substantially different from the entry face angle; and a second redirection angle between the second entry tangent and the exit tangent, wherein the second redirection angle is substantially less than the redirection angle.

4. The system of Specific Example 2 or 3, wherein the transverse translator comprises a first multi-bend achromat defined between a second dipole magnet and the merge dipole magnet, wherein:

the first multi-bend achromat terminates at the first region;

the injection beamline, the second beamline, and the merged beamline lie substantially on a first transverse plane;

the merge dipole magnet is configured to bend the first electron beam by a first angle in a first direction about a first transverse axis normal to the first transverse plane, wherein the first transverse axis intersects the merge dipole magnet; and the second dipole magnet is configured to bend the first electron beam by a second angle in the first direction about a second transverse axis substantially parallel to the first transverse axis, wherein the second transverse axis intersects the second dipole magnet, wherein the second angle is substantially equal to the first angle.

5. The system of Specific Example 4, wherein the first multi-bend achromat further comprises a plurality of solenoids arranged along the injection beamline between the second dipole magnet and the merge dipole magnet, the plurality of solenoids comprising:

a first solenoid having a first polarity;

a second solenoid having the first polarity; and a third solenoid having a second polarity opposite the first polarity, wherein the third solenoid is arranged between the first solenoid and the second solenoid.

6. The system of Specific Example 4 or 5, further comprising a second multi-bend achromat arranged along the injection beamline upstream of the first multi-bend achromat.

7. The system of Specific Example 6, further comprising a plurality of solenoids arranged along the injection beamline between the first multi-bend achromat and the second multi-bend achromat, the plurality of solenoids comprising:

a first solenoid having a positive polarity; and a second solenoid having a negative polarity;

wherein:

the first multi-bend achromat is a first double-bend achromat; and the second multi-bend achromat is a second double-bend achromat.

8. The system of any of Specific Examples 2-7, wherein the second beamline comprises a dispersion suppressor arranged along the second beam path, the dispersion suppressor terminating at the second region.

9. The system of Specific Example 8, wherein:

the merge dipole magnet is configured to redirect the second beam path by a second redirection angle;

the second beamline further comprises a second dipole magnet configured to redirect the second beam path by a third redirection angle substantially equal to the second redirection angle; and the dispersion suppressor is defined between the second dipole magnet and the merge dipole magnet.

10. The system of any of the preceding Specific Examples, further comprising:

a separator dipole magnet arranged along the merged trajectory; and an energy recovery accelerator arranged along the merged trajectory between the merge dipole magnet and the separator dipole magnet;

wherein the separator dipole magnet is configured to:

receive the first and second electron beams from the energy recovery accelerator;

direct the first electron beam along a third beam path; and direct the second electron beam along a fourth beam path to a beam dump, the fourth beam path different from the third beam path.

11. The system of Specific Example 10, wherein the third beam path terminates at the second beamline, wherein the first electron beam is directed along the second beam path via the third beam path.

12. The system of Specific Example 11, further comprising an undulator arranged along the third beam path, the undulator configured to oscillate the first electron beam such that the first electron beam generates a light output via free-electron lasing.

13. A method comprising:

at an injection beamline:

receiving a first electron beam defining a first average electron energy; and directing the first electron beam along a transverse translator to a first region of a merge element;

at a second beamline:

receiving a second electron beam defining a second average electron energy substantially greater than the first average electron energy; and directing the second electron beam to a second region of the merge element, wherein the second region does not intersect the first region; and at the merge element:

receiving the first electron beam at the first region;

substantially concurrent with receiving the first electron beam, receiving the second electron beam at the second region;

directing the first electron beam from the first region onto a merged trajectory; and directing the second electron beam from the second region onto the merged trajectory such that the first and second electron beams are substantially collinear.

14. The method of Specific Example 13, wherein:

the merge element is a dipole magnet comprising an entry face and an exit face, wherein the entry face and the exit face are substantially planar;

the entry face defines an entry face normal vector;

the exit face defines an exit face normal vector;

the first electron beam enters the dipole magnet directed along an entry tangent vector;

the first electron beam exits the dipole magnet directed along an exit tangent vector;

an entry face angle between the entry tangent vector and the entry face normal vector is substantially equal to an exit face angle between the exit tangent vector and the exit face normal vector; and a first redirection angle between the entry tangent vector and the exit tangent vector is substantially four times the entry face angle.

15. The method of Specific Example 14, wherein first electron beam traverses the transverse translator in a substantially axisymmetric and substantially achromatic manner.

16. The method of Specific Example 14 or 15, wherein:

the transverse translator comprises:

a first double-bend achromat; and a second double-bend achromat that terminates at the merge element; and the first electron beam traverses the first and second double-bend achromats in a substantially axisymmetric and substantially achromatic manner.

17. The method of any of Specific Examples 14-16, wherein:

the transverse translator terminates at the first region; and directing the second electron beam to the second region comprises directing the second electron beam through a dispersion suppressor that terminates at the second region.

18. The method of Specific Example 17, wherein the dispersion suppressor defines a chicane between a second dipole magnet and the merge element.

19. The method of any of Specific Examples 13-18, further comprising, after directing the first electron beam onto the merged trajectory and directing the second electron beam onto the merged trajectory:

transferring energy from the second electron beam to the first electron beam such that:

the first electron beam defines a third average electron energy; and the second electron beam defines a fourth average electron energy substantially less than the third average electron energy;

after transferring the energy, at a separator element:

receiving the first and second electron beams;

directing the first electron beam onto a primary beamline; and not directing the second electron beam onto the primary beamline;

at the primary beamline, directing the first electron beam to the second beamline;

at the injection beamline:

receiving a third electron beam defining a fifth average electron energy substantially equal to the first average electron energy; and directing the third electron beam along the transverse translator to the first region;

at the second beamline:

receiving the first electron beam from the primary beamline; and directing the first electron beam to the second region; and at the merge element:

receiving the third electron beam at the first region;

substantially concurrent with receiving the first electron beam, receiving the first electron beam at the second region;

directing the third electron beam from the first region onto the merged trajectory; and directing the first electron beam from the second region onto the merged trajectory such that the first and third electron beams are substantially collinear.

20. The method of Specific Example 19, further comprising, after directing the first electron beam onto the primary beamline and before directing the first electron beam to the second beamline, at the primary beamline, directing the first electron beam through an undulator such that the first electron beam generates a light output via free-electron lasing.

21. The method of any of Specific Examples 13-20, wherein the method is performed at the particle accelerator system of any of Specific Examples 1-12, wherein the merge element comprises the merge dipole magnet.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A particle accelerator system comprising:
- a merge dipole magnet;
- an injection beamline defining a first beam path from an injection point to the merge dipole magnet via a transverse translator, wherein the transverse translator:
  - comprises a plurality of magnets;
  - terminates at a first region of the merge dipole; and
  - is configured to direct a first electron beam substantially along the first beam path to first region, the first electron beam defining a first average electron energy;
- a second beamline defining a second beam path from a second point to the merge dipole magnet, wherein the second beamline:
  - terminates at a second region of the merge dipole, wherein the second region does not intersect the first region; and
  - is configured to direct a second electron beam substantially along the second beam path to the second region, the second electron beam defining a second average electron energy substantially greater than the first average electron energy;

wherein the merge dipole magnet is configured to:
- direct the first electron beam from the first region onto a merged trajectory; and
- direct the second electron beam from the second region onto the merged trajectory.

2. The system of claim 1, wherein:
- the merge dipole magnet comprises an entry face and an exit face, wherein the entry face and the exit face are substantially planar;
- the first region is on the entry face, wherein the first beam path defines an entry tangent at the entry face;
- the merged trajectory extends outward from the merge dipole magnet at the exit face, wherein the merged trajectory defines an exit tangent at the exit face;
- the system defines:
  - an entry face angle between the entry tangent and an entry face normal vector;
  - an exit face angle between the exit tangent and an exit face normal vector, wherein the exit face angle is substantially equal to the entry face angle; and
  - a first redirection angle between the entry tangent and the exit tangent, wherein the first redirection angle is substantially four times the entry face angle.

3. The system of claim 2, wherein:
- the second region is on the entry face, wherein the second beam path defines a second entry tangent at the entry face; and
- the system further defines:
  - a second entry face angle between the second entry tangent and the entry face normal vector, wherein the second entry face angle is substantially different from the entry face angle; and
  - a second redirection angle between the second entry tangent and the exit tangent, wherein the second redirection angle is substantially less than the redirection angle.

4. The system of claim 2, wherein the transverse translator comprises a first multi-bend achromat defined between a second dipole magnet and the merge dipole magnet, wherein:
- the first multi-bend achromat terminates at the first region;
- the injection beamline, the second beamline, and the merged beamline lie substantially on a first transverse plane;
- the merge dipole magnet is configured to bend the first electron beam by a first angle in a first direction about a first transverse axis normal to the first transverse plane, wherein the first transverse axis intersects the merge dipole magnet; and
- A the second dipole magnet is configured to bend the first electron beam by a second angle in the first direction about a second transverse axis substantially parallel to the first transverse axis, wherein the second transverse axis intersects the second dipole magnet, wherein the second angle is substantially equal to the first angle.

5. The system of claim 4, wherein the first multi-bend achromat further comprises a plurality of solenoids arranged along the injection beamline between the second dipole magnet and the merge dipole magnet, the plurality of solenoids comprising:
- a first solenoid having a first polarity;
- a second solenoid having the first polarity; and
- a third solenoid having a second polarity opposite the first polarity, wherein the third solenoid is arranged between the first solenoid and the second solenoid.

6. The system of claim 4, further comprising a second multi-bend achromat arranged along the injection beamline upstream of the first multi-bend achromat.

7. The system of claim 6, further comprising a plurality of solenoids arranged along the injection beamline between the first multi-bend achromat and the second multi-bend achromat, the plurality of solenoids comprising:
- a first solenoid having a positive polarity; and
- a second solenoid having a negative polarity;

wherein:
- the first multi-bend achromat is a first double-bend achromat; and
- the second multi-bend achromat is a second double-bend achromat.

8. The system of claim 2, wherein the second beamline comprises a dispersion suppressor arranged along the second beam path, the dispersion suppressor terminating at the second region.

9. The system of claim 8, wherein:
- the merge dipole magnet is configured to redirect the second beam path by a second redirection angle;
- the second beamline further comprises a second dipole magnet configured to redirect the second beam path by a third redirection angle substantially equal to the second redirection angle; and
- the dispersion suppressor is defined between the second dipole magnet and the merge dipole magnet.

10. The system of claim 1, further comprising:

a separator dipole magnet arranged along the merged trajectory; and an energy recovery accelerator arranged along the merged trajectory between the merge dipole magnet and the separator dipole magnet;

wherein the separator dipole magnet is configured to:

receive the first and second electron beams from the energy recovery accelerator;

direct the first electron beam along a third beam path; and direct the second electron beam along a fourth beam path to a beam dump, the fourth beam path different from the third beam path.

11. The system of claim 10, wherein the third beam path terminates at the second beamline, wherein the first electron beam is directed along the second beam path via the third beam path.

12. The system of claim 11, further comprising an undulator arranged along the third beam path, the undulator configured to oscillate the first electron beam such that the first electron beam generates a light output via free-electron lasing.

13. A method comprising:

at an injection beamline:

receiving a first electron beam defining a first average electron energy; and directing the first electron beam along a transverse translator to a first region of a merge element;

at a second beamline:

receiving a second electron beam defining a second average electron energy substantially greater than the first average electron energy; and directing the second electron beam to a second region of the merge element, wherein the second region does not intersect the first region; and at the merge element:

receiving the first electron beam at the first region;

substantially concurrent with receiving the first electron beam, receiving the second electron beam at the second region;

directing the first electron beam from the first region onto a merged trajectory; and directing the second electron beam from the second region onto the merged trajectory such that the first and second electron beams are substantially collinear.

14. The method of claim 13, wherein:

the merge element is a dipole magnet comprising an entry face and an exit face, wherein the entry face and the exit face are substantially planar;

the entry face defines an entry face normal vector;

the exit face defines an exit face normal vector;

the first electron beam enters the dipole magnet directed along an entry tangent vector;

the first electron beam exits the dipole magnet directed along an exit tangent vector;

entry face angle between the entry tangent vector and the entry face normal vector is substantially equal to an exit face angle between the exit tangent vector and the exit face normal vector; and a first redirection angle between the entry tangent vector and the exit tangent vector is substantially four times the entry face angle.

15. The method of claim 14, wherein first electron beam traverses the transverse translator in a substantially axisymmetric and substantially achromatic manner.

16. The method of claim 14, wherein:

the transverse translator comprises:

a first double-bend achromat; and a second double-bend achromat that terminates at the merge element; and the first electron beam traverses the first and second double-bend achromats in a substantially axisymmetric and substantially achromatic manner.

17. The method of claim 14, wherein:

the transverse translator terminates at the first region; and directing the second electron beam to the second region comprises directing the second electron beam through a dispersion suppressor that terminates at the second region.

18. The method of claim 17, wherein the dispersion suppressor defines a chicane between a second dipole magnet and the merge element.

19. The method of claim 13, further comprising, after directing the first electron beam onto the merged trajectory and directing the second electron beam onto the merged trajectory:

A transferring energy from the second electron beam to the first electron beam such that:

the first electron beam defines a third average electron energy; and the second electron beam defines a fourth average electron energy substantially less than the third average electron energy;

after transferring the energy, at a separator element:

receiving the first and second electron beams;

directing the first electron beam onto a primary beamline; and not directing the second electron beam onto the primary beamline;

at the primary beamline, directing the first electron beam to the second beamline;

at the injection beamline:

receiving a third electron beam defining a fifth average electron energy substantially equal to the first average electron energy; and directing the third electron beam along the transverse translator to the first region;

at the second beamline:

receiving the first electron beam from the primary beamline; and directing the first electron beam to the second region; and at the merge element:

receiving the third electron beam at the first region;

A substantially concurrent with receiving the first electron beam, receiving the first electron beam at the second region;

a directing the third electron beam from the first region onto the merged trajectory; and directing the first electron beam from the second region onto the merged trajectory such that the first and third electron beams are substantially collinear.

20. The method of claim 19, further comprising, after directing the first electron beam onto the primary beamline and before directing the first electron beam to the second beamline, at the primary beamline, directing the first electron beam through an undulator such that the first electron beam generates a light output via free-electron lasing.

* * * * *